US012272290B2

(12) United States Patent
Liu et al.

(10) Patent No.: US 12,272,290 B2
(45) Date of Patent: Apr. 8, 2025

(54) FLAT PANEL DETECTOR FOR PHOTOELECTRIC DETECTION AND METHOD PERFORMED BY THE FLAT PANEL DETECTOR

(71) Applicants: Beijing BOE Sensor Technology Co., Ltd., Beijing (CN); BOE Technology Group Co., Ltd., Beijing (CN)

(72) Inventors: Feng Liu, Beijing (CN); Chuncheng Che, Beijing (CN); Shuai Xu, Beijing (CN)

(73) Assignees: BEIJING BOE SENSOR TECHNOLOGY CO., LTD., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/015,631

(22) PCT Filed: Dec. 29, 2021

(86) PCT No.: PCT/CN2021/142361
§ 371 (c)(1),
(2) Date: Jan. 11, 2023

(87) PCT Pub. No.: WO2023/123017
PCT Pub. Date: Jul. 6, 2023

(65) Prior Publication Data

US 2024/0242657 A1 Jul. 18, 2024

(51) Int. Cl.
*G09G 3/20* (2006.01)

(52) U.S. Cl.
CPC ... *G09G 3/2092* (2013.01); *G09G 2300/0404* (2013.01); *G09G 2310/08* (2013.01); *G09G 2360/14* (2013.01); *G09G 2380/08* (2013.01)

(58) Field of Classification Search
CPC ............. G09G 3/2092; G09G 2310/08; G09G 2380/08
See application file for complete search history.

(56) References Cited

U.S. PATENT DOCUMENTS

2013/0163722 A1 6/2013 Okada et al.
2013/0229555 A1* 9/2013 Hashimoto ............ H04N 25/75 348/300

(Continued)

FOREIGN PATENT DOCUMENTS

CN 101841633 A 9/2010
CN 103176199 A 6/2013

(Continued)

OTHER PUBLICATIONS

International Search Report dated Sep. 9, 2022, issued in counterpart International application No. PCT/CN2021/142361, with English translation. (5 pages).

(Continued)

*Primary Examiner* — Lisa S Landis
(74) *Attorney, Agent, or Firm* — WHDA, LLP

(57) ABSTRACT

A flat panel detector and a method performed by the flat panel detector are provided. A plurality of pixel units are arranged in an array, each pixel unit includes pixels arranged in a K×K sub-array, and each pixel is configured to provide a photoelectric signal. K is an odd number greater than 1. A gate driving circuit is configured to turn on the pixel units row by row under, so as to cause K rows of pixels in each turned-on pixel unit to generate photoelectric signals. A readout circuit is configured to read photoelectric signals from K columns of pixels in each column of pixel units, and generate image data for each pixel unit according to the photoelectric signals. A control circuit is connected to the gate driving circuit and the readout circuit.

15 Claims, 9 Drawing Sheets

320

(56) References Cited

U.S. PATENT DOCUMENTS

| | | | | |
|---|---|---|---|---|
| 2016/0134822 | A1* | 5/2016 | Kosonen | H04N 25/46 348/308 |
| 2019/0198702 | A1 | 6/2019 | Yoon et al. | |
| 2020/0161493 | A1* | 5/2020 | Lee | G06F 3/04184 |
| 2020/0258463 | A1* | 8/2020 | Kim | G09G 3/3677 |

FOREIGN PATENT DOCUMENTS

| | | | |
|---|---|---|---|
| CN | 105187741 | A | 12/2015 |
| CN | 105359506 | A | 2/2016 |
| CN | 109994495 | A | 7/2019 |

OTHER PUBLICATIONS

Written Opinion dated Sep. 9, 2022, issued in counterpart International application No. PCT/CN2021/142361. (5 pages).

* cited by examiner

FLAT PANEL DETECTOR FOR PHOTOELECTRIC DETECTION AND METHOD PERFORMED BY THE FLAT PANEL DETECTOR

TECHNICAL FIELD

The present disclosure relates to a field of photoelectric detecting technology, particular to a flat panel detector and a method performed by the flat panel detector.

BACKGROUND

Flat Panel Detector (FPD) may be configured to perform X-ray static imaging and X-ray dynamic imaging. Binning is a kind of image data reading mode, which may add up charges induced in adjacent pixel elements and read out in one pixel mode. Binning is divided into a horizontal binning and a vertical binning. The horizontal binning is to add up and read charges from adjacent rows, and the vertical binning is to add up and read charges from adjacent columns. A readout circuit of the flat panel detector may perform dynamic imaging based on the binning technology.

SUMMARY

Based on this, the present disclosure provides a flat panel detector and a method performed by the flat panel detector.

According to a first aspect, the present disclosure provides a flat panel detector including: a plurality of pixel units arranged in an array, wherein each of the plurality of pixel units includes a plurality of pixels arranged in a K×K sub-array, each of the plurality of pixels is configured to provide a photoelectric signal, and K is an odd number greater than 1; a gate driving circuit connected to a plurality of rows of pixel units in the array, wherein the gate driving circuit is configured to turn on the pixel units row by row under control of a gate control signal, so as to cause K rows of pixels in each turned-on pixel unit to generate photoelectric signals; a readout circuit connected to a plurality of columns of pixel units in the array, wherein the readout circuit is configured to read photoelectric signals from K columns of pixels in each column of pixel units under control of a readout control signal, and generate image data for each pixel unit according to the photoelectric signals read from the each pixel unit; and a control circuit connected to the gate driving circuit and the readout circuit, wherein the control circuit is configured to provide the gate control signal to the gate driving circuit, provide the readout control signal to the readout circuit, and perform data processing based on the image data provided by the readout circuit.

In some embodiments, the gate driving circuit is configured to, in an $i^{th}$ detecting period, turn on K rows of pixels in each pixel unit of an $i^{th}$ row of pixel units row by row under control of the gate control signal, so as to cause each turned-on row of pixels to generate photoelectric signals, wherein i is an integer greater than or equal to 1.

In some embodiments, the gate control signal includes a clock signal and an enable signal, the $i^{th}$ detecting period includes K sub-periods, the gate driving circuit is configured to, in a $k^{th}$ sub-period of the $i^{th}$ period, generate a gate driving signal based on the enable signal under control of the clock signal and provide the gate driving signal to a $k^{th}$ row of pixels in each pixel unit of the $i^{th}$ row of pixel units, so that the $k^{th}$ row of pixels are turned on, wherein k is an integer and $1 \leq k \leq K$.

In some embodiments, the gate driving circuit includes: a first gate driving circuit connected to (K−1) rows of pixels in each pixel unit of each row of pixel units, wherein the first gate driving circuit is configured to, in an $i^{th}$ detecting period, simultaneously turn on (K−1) rows of pixels, which are connected to the first gate driving circuit, in an $i^{th}$ row of pixel units under control of the gate control signal, so as to cause the turned-on (K−1) rows of pixels to generate photoelectric signals, wherein i is an integer greater than or equal to 1; and a second gate driving circuit connected to one row of pixels except the (K−1) rows of pixels in each pixel unit of each row of pixel units, wherein the second gate driving circuit is configured to, in the $i^{th}$ detecting period, turn on one row of pixels, which are connected to the second gate driving circuit, in the $i^{th}$ row of pixel units under control of the gate control signal, so as to cause the turned-on one row of pixels to generate photoelectric signals.

In some embodiments, the gate control signal includes a first clock signal, a second clock signal, a first enable signal and a second enable signal, wherein the first clock signal is synchronized with the second clock signal, and the first enable signal is synchronized with the second enable signal. The first gate driving circuit is configured to, in the $i^{th}$ detecting period, generate a gate driving signal based on the first enable signal under control of the first clock signal and provide the gate driving signal to (K−1) rows of pixels, which are connected to the first gate driving circuit, in the $i^{th}$ row of pixel units. The first gate driving circuit is configured to, in the $i^{th}$ detecting period, generate a gate driving signal based on the second enable signal under control of the second clock signal and provide the gate driving signal to one row of pixels, which are connected to the second gate driving circuit, in the $i^{th}$ row of pixel units.

In some embodiments, the plurality of pixel units arranged in the array are disposed between the first gate driving circuit and the second gate driving circuit in a row direction of the array.

In some embodiments, K=3 or 5.

In some embodiments, K=3, the first gate driving circuit is connected to the first row of pixels and the third row of pixels in each pixel unit of each row of pixel units, and the second gate driving circuit is connected to the second row of pixels in each pixel unit of each row of pixel units.

In some embodiments, the gate driving circuit includes a plurality of shift register units cascaded into stages, wherein a cascade output terminal of an $n^{th}$ stage of shift register unit is connected to an input terminal of a (n+1)th stage of shift register unit, a signal output terminal of each shift register unit is connected to one row of pixels, a clock terminal of each shift register unit is connected to receive a clock signal, an enable terminal of each shift register unit is connected to receive an enable signal, and each shift register unit is configured to provide a cascade output signal at the cascade output terminal and provide a gate driving signal at the signal output terminal, based on a signal at the input terminal and the enable signal at the enable terminal under control of the clock signal at the clock terminal.

In some embodiments, the readout control signal includes a first sampling control signal and a second sampling control signal. The readout circuit includes a plurality of readout channels connected to the plurality of columns of pixel units in the array in one-to-one correspondence, wherein each of the plurality of readout channels includes a first sampling sub-circuit and a second sampling sub-circuit, the first sampling sub-circuit is configured to read a noise signal from K columns of pixels in the column of pixel units which are connected to the first sampling sub-circuit under control of a first readout control signal between an $(i-1)^{th}$ detecting period to an $i^{th}$ detecting period; and the second sampling sub-circuit is configured to read photoelectric signals from K columns of pixels in the column of pixel units which are connected to the second sampling sub-circuit under control of a second readout control signal in the $i^{th}$ detecting period; and a signal conversion circuit connected to the plurality of readout channels, wherein the signal conversion circuit is configured to convert a signal from the plurality of readout channels into image data supported by the control circuit.

In some embodiments, the readout circuit is a readout integrated circuit (ROIC), and the control circuit is a field programmable gate array (FPGA).

According to a second aspect, the present disclosure provides a detecting method performed by the flat panel detector as provided in the present disclosure, including: providing, by a control circuit, a gate control signal to a gate driving circuit and providing a readout control signal to a readout circuit; turning on, by the gate driving circuit, pixel units row by row under control of the gate control signal, so as to cause K rows of pixels in each turned-on pixel unit to generate photoelectric signals; reading, by the readout circuit, photoelectric signals from K columns of pixels in each columns of pixel units under control of the readout control signal, and generating image data for each pixel unit according to the photoelectric signals read from the each pixel unit; and performing, by the control circuit, image processing based on the image data provided by the readout circuit.

In some embodiments, turning on pixel units row by row; so as to cause K rows of pixels in each turned-on pixel unit to generate photoelectric signals, includes: in an $i^{th}$ detecting period, turning on K rows of pixels in each pixel unit of an $i^{th}$ row of pixel units row by row; so as to cause each turned-on row of pixels to generate photoelectric signals, wherein i is an integer greater than or equal to 1.

In some embodiments, the gate control signal includes a clock signal and an enable signal, the $i^{th}$ detecting period includes K sub-periods, and in the $i^{th}$ detecting period, turning on K rows of pixels in each pixel unit of the $i^{th}$ row of pixel units row by row so that the turned-on each row of pixels generate the photoelectric signals, includes: in a $k^{th}$ sub-period of the $i^{th}$ period, generating a gate driving signal based on the enable signal under control of the clock signal and providing the gate driving signal to a $k^{th}$ row of pixels in each pixel unit of the $i^{th}$ row of pixel units, so that the $k^{th}$ row of pixels are turned on, wherein k is an integer and $1 \leq k \leq K$.

In some embodiments, the gate driving circuit includes a first gate driving circuit and a second gate driving circuit, and turning on pixel units row by row, so as to cause K rows of pixels in each turned-on pixel unit to generate photoelectric signals includes: in an $i^{th}$ detecting period, simultaneously turning on, by the first gate driving circuit, (K−1) rows of pixels connected to the first gate driving circuit in an $i^{th}$ row of pixel units under control of the gate control signal, so as to cause the turned-on (K−1) rows of pixels to generate photoelectric signals, wherein i is an integer greater than or equal to 1; and in the $i^{th}$ detecting period, turning on, by the second gate driving circuit, one row of pixels connected to the second gate driving circuit in the $i^{th}$ row of pixel units under control of the gate control signal, so as to cause the turned-on one row of pixels to generate photoelectric signals.

In some embodiments, the gate control signal includes a first clock signal, a second clock signal, a first enable signal and a second enable signal, wherein the first clock signal is synchronized with the second clock signal, and the first enable signal is synchronized with the second enable signal, in the $i^{th}$ detecting period, the first gate driving circuit generates a gate driving signal based on the first enable signal under control of the first clock signal and provides the gate driving signal to (K−1) rows of pixels, which are connected to the first gate driving circuit, in the $i^{th}$ row of pixel units; and in the $i^{th}$ detecting period, the first gate driving circuit generates a gate driving signal based on the second enable signal under control of the second clock signal and provides the gate driving signal to one row of pixels, which are connected to the second gate driving circuit, in the $i^{th}$ row of pixel units.

DETAILED DESCRIPTION OF EMBODIMENTS

Although the present disclosure will be fully described with reference to the drawings containing preferred embodiments of the present disclosure, those skilled in the art should know this field may modify the disclosure described herein before this description, and obtain the technical effect of the present disclosure. Therefore, it should be understood that the above description is a broad disclosure for those skilled in the art, and its content does not intend to limit the exemplary embodiments described in the present disclosure.

In addition, in the following detailed description, for the convenience of interpretation, many specific details are set forth to provide a comprehensive understanding of the embodiments of the present disclosure. However, it is apparent that one or more embodiments may also be implemented without these specific details. In other cases, well-known structures and devices are embodied as illustrative so as to simplify the drawings.

Unless otherwise defined, technical or scientific terms used in the embodiments of the present disclosure may have the ordinary meanings as understood by one of ordinary skill in the art to which the present disclosure belongs. The terms "first", "second" and similar terms used in the embodiments of the present disclosure do not denote any order, quantity or importance, but are merely used to distinguish the various components.

In addition, in the description of the embodiments of the present disclosure, the terms "connected" or "connected to" may refer to the direct connection of two components, or the connection between two components via one or more other components. In addition, the two components may be connected or coupled by wired or wireless means.

The embodiment of the present disclosure provides a flat panel detector and a method performed by the flat panel detector. The gate driving circuit and the readout circuit are be controlled to perform scanning and reading data by taking K×K pixels as a pixel unit, such that the gate driving circuit with function of single-row scanning or double-rows scanning may be used to achieve binning reading by taking odd number of rows and odd number of columns of pixels as a unit.

Figure 1:
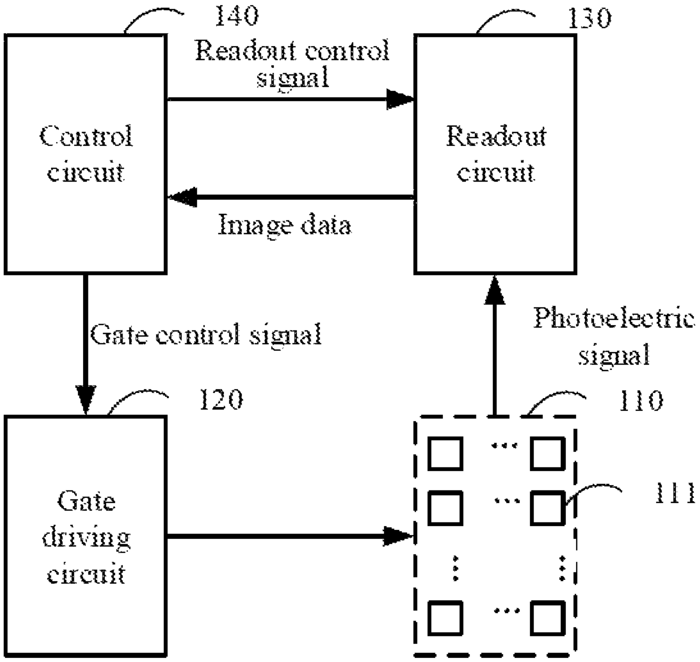
FIG. 1 is a schematic block diagram of a flat panel detector according to an embodiment of the present disclosure.
Figure 2:
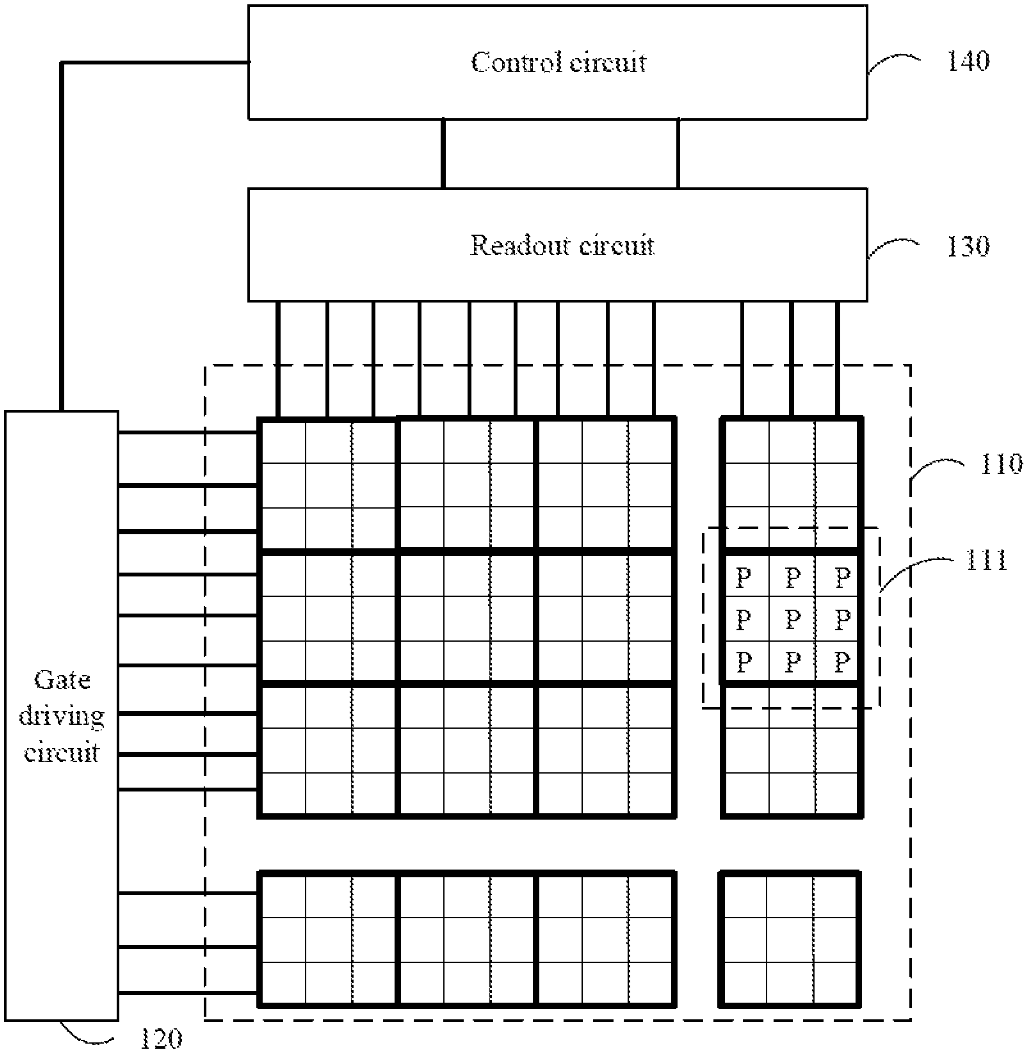
FIG. 2 is a schematic block diagram of a flat panel detector according to another embodiment of the present disclosure.

An example structure of the flat panel detector of the embodiment of the present disclosure will be described below with reference to FIG. 1 and FIG. 2. FIG. 1 is a schematic block diagram of a horizontal detector according to an embodiment of the present disclosure. FIG. 2 is a schematic block diagram of a flat panel detector according to another embodiment of the present disclosure.

As shown in FIG. 1 and FIG. 2, the horizontal detector 100 includes a plurality of pixel units 111 arranged in an array 110, each of the plurality of pixel units 111 includes pixels P arranged in a K×K sub-array, each pixel P is configured to provide a photoelectric signal. For example, K is an odd number greater than 1. In some embodiments, K=3 or 5. For example, in FIG. 2, each pixel unit 111 includes pixels P arranged in a 3×3 sub-array.

A gate driving circuit 120 is connected to a plurality of rows of pixel units 111 in the array 110. As shown in FIG. 2, the gate driving circuit 120 is connected to a plurality of rows of pixels P by a plurality of gate lines respectively. For example, each gate line is connected to one row of pixels P, so as to achieve a connection between the gate driving circuit 120 and each row of pixel units 111. The gate driving circuit 120 may turn on the pixel units 111 row by row under control of the gate control signal, so as to cause K rows of pixels P in each turned-on pixel unit 111 to generate photoelectric signals. For example, in FIG. 2, the gate driving circuit 120 may turn on respective rows of pixel units 111 in an order of the first row; the second row; the third row . . . . In the process of turning on each row of pixel units 111, three rows of pixels contained in each row of pixel units 111 may be turned on at the same time, or three rows of pixels contained in each row of pixel units 111 may be turned on in an order of the first row, the second row, and the third row; which will be further described in detail below.

The readout circuit 130 is connected to a plurality of columns of pixel units 111 in the array 110. The readout circuit 130 may, read photoelectric signals from K columns of pixels P in each column of pixel units 111 under control of a readout control signal, and generate image data for each pixel unit 111 according to the photoelectric signals read from the each pixel unit 111. In some embodiments, the readout circuit 130 may be connected to a plurality of columns of pixels P by a plurality of readout signal lines, each signal line is connected to one column of pixels P, and the control circuit 140 combines data read from respective columns of pixels P by combining data from every three columns of pixels P into a unit, so as to obtain data for each pixel unit by taking 3×3 pixels as a pixel unit. In other embodiments, every three signal lines may be connected together and provided to an input terminal of the readout circuit 130, so that the readout circuit 130 may perform data reading by taking charges generated by three columns of pixels P as a unit, so as to obtain data for each pixel unit by taking 3×3 pixels as a pixel unit.

The control circuit 140 is connected to the gate driving circuit 120 and the readout circuit 130. The control circuit 140 may provide the gate control signal to the gate driving circuit 120, provide the readout control signal to the readout circuit 130, and perform data processing based on the image data provided by the readout circuit 130.

Generally, the gate driving circuit has an ability of single-row scanning or double-rows scanning. The gate driving circuit having the ability of single-row scanning scans respective rows of pixels row by row. For example, the gate driving circuit having the ability of single-row scanning scans respective rows of pixels in an order of the first row; the second row, the third row, . . . , or scans respective rows of pixels in an order of the first row; the third row, the fifth row . . . . The gate driving circuit having the ability of double-rows scanning scans respective rows of pixels in a manner of two rows by two rows. For example, the gate driving circuit of double-rows scanning first turns on the first row of pixels and the second row of pixels, then turns on the third row of pixels and the fourth row of pixels, and so on. The gate driving circuit having the ability of single-row scanning or double-rows scanning may be used to achieve binning reading by taking 2×2 pixels as a unit or taking 4×4 pixels as a unit. However, the frame rate of a dynamic image obtained by taking 2×2 pixels as a unit is low; while the resolution of an image obtained by taking 4×4 pixels as a unit is low.

The embodiment of the present disclosure controls the gate driving circuit and the readout circuit to scan and read data by taking K×K pixels as a pixel unit. The gate driving circuit with function of single-row scanning or double-rows scanning may be used to achieve binning reading by taking odd number of rows and odd number of columns of pixels as a unit. So that more diversified binning reading methods may be achieved in a simpler way. According to the embodiment of the disclosure, an image obtained by taking 3×3 pixels as a pixel unit may effectively achieve a trade-off between a frame rate of a dynamic image and a resolution of the image.

In some embodiments, the number and the arrangement of pixels in each pixel unit may be selected as desired. For example, each pixel unit may include pixels arranged in a 5×5 sub-array. The gate driving circuit is connected to a plurality of rows of pixel units in the array. For example, the gate driving circuit is connected to five rows of pixels in each pixel unit, so as to cause five rows of pixels in each turned-on pixel unit to generate photoelectric signals. The readout circuit is connected to five columns of pixels in each pixel unit to read photoelectric signals from five columns of pixels in each column of pixel units.

Figure 3:
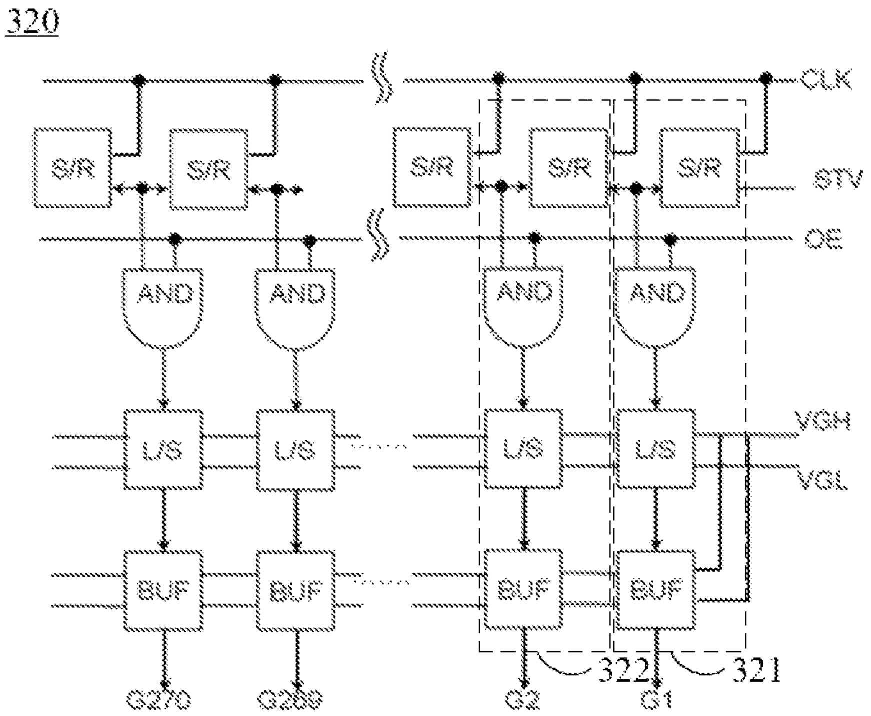
FIG. 3 is a circuit diagram of a gate driving circuit of a flat panel detector according to another embodiment of the present disclosure.

FIG. 3 is a circuit diagram of a gate driving circuit of a flat panel detector according to another embodiment of the present disclosure.

The above description of the gate driving circuit 120 is also applicable to this embodiment.

As shown in FIG. 3, the gate driving circuit 320 includes a plurality of shift register units cascaded into stages, wherein a cascade output terminal of an $n^{th}$ stage of shift register unit is connected to an input terminal of a (n+1)th stage of shift register unit. N is an integer greater than or equal to 1. For example, a cascade output terminal of a first stage of shift register unit 321 is connected to an input terminal of a second stage of shift register unit 322, a cascade output terminal of the second stage of shift register unit 322 is connected to an input terminal of a third stage of shift register unit, and so on.

A signal output terminal of each shift register unit is connected to one row of pixels. For example, the signal output terminal G1 of the shift register unit 321 is connected to, for example, the first row of pixels in the array 110 in FIG. 2, the signal output terminal G2 of the shift register unit 322 is connected to, for example, the second row of pixels in the array 110 in FIG. 2, and so on.

A clock terminal of each shift register unit is connected to receive a clock signal CLK. An enable terminal of each shift register unit is connected to receive an enable signal OE. Each shift register unit may provide a cascade output signal at the cascade output terminal and provide a gate driving signal at the signal output terminal, based on a signal at the input terminal and an enable signal OE at the enable terminal, under control of the clock signal CLK at the clock terminal. For example, the shift register unit 321 may provide a cascade output signal at the cascade output terminal and provide a gate driving signal at the signal output terminal G1, based on a signal STV at the input terminal and an enable signal OE at the enable terminal under control of the clock signal CLK at the clock terminal. The shift register unit 322 may provide a cascade output signal at the cascade output terminal and provide a gate driving signal at the signal output terminal G2 based on the signal STV at the input terminal and an enable signal OE at the enable terminal under control of the clock signal CLK at the clock terminal.

As shown in FIG. 3, each shift register unit includes a shift register S/R, an AND gate, a level shifter L/S and an output buffer circuit BUF.

The shift register S/R may include a D flip-flop. One input terminal of the shift register S/R is configured to be a clock terminal of the shift register unit. The other input terminal of the shift register S/R is connected to receive a signal STV or the cascade output signal provided by an upper stage of shift register unit. The output terminal of the shift register S/R is configured to be a cascade output terminal of the shift register unit.

One input terminal of the AND gate of the shift register unit is configured to be an enable terminal of the shift register unit. The other input terminal of the AND gate is connected to an output terminal of the shift register S/R. The output terminal of the AND gate is connected to the input terminal of the level shifter L/S. The level shifter L/S may generate an output signal based on a supply voltage VGH and a reference voltage VGL and provide the output signal to an output buffer BUF.

An input terminal of the output buffer circuit BUF is connected to the output terminal of the level shifter L/S, and an output terminal of the output buffer circuit BUF is configured to provide a corresponding gate driving signal as an output terminal of the shift register unit. The output buffer circuit BUF may act as a voltage follower to improve a driving ability of the gate driving circuit.

Figure 4:
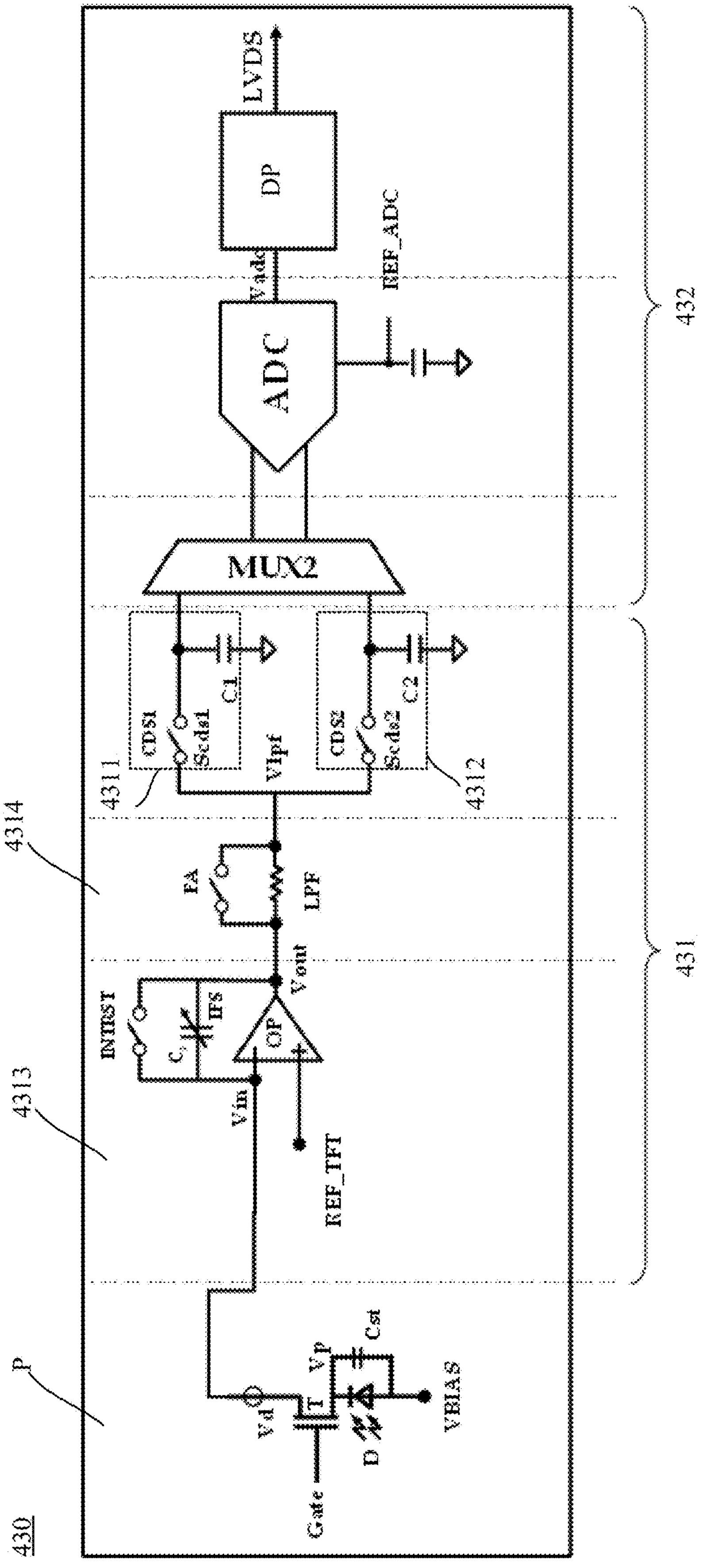
FIG. 4 is a circuit diagram of a readout circuit of a flat panel detector according to another embodiment of the present disclosure.

FIG. 4 is a circuit diagram of a readout circuit of a flat panel detector according to another embodiment of the present disclosure. The above description of the readout circuit 130 is also applicable to this embodiment.

As shown in FIG. 4, the readout circuit 430 includes a plurality of readout channels 431 and a signal conversion circuit 432 connected to the plurality of readout channels 431. For simplicity, FIG. 4 shows only one readout channel 431. The plurality of readout channels 431 are connected to the plurality of columns of pixel units in the array in one-to-one correspondence. For example, each readout channel 431 is connected to one column of pixel units. In some embodiments, each readout channel 431 includes a first sampling sub-circuit 4311 and a second sampling sub-circuit 4312. In some embodiments, the readout channel 431 also includes a charge collecting sub-circuit 4313. In other embodiments, the readout channel 431 also includes the charge collecting sub-circuit 4313 and a filter sub-circuit 4314, which will be described in further detail below.

As shown in FIG. 4, one pixel P in one column of pixel units is taken as an example. The pixel P includes a transistor T, a photodiode D, and a storage capacitor Cst. A gate of the transistor T is connected to a signal output terminal Gate. A first electrode of the transistor T is connected to the charge collecting sub-circuit 4313. One terminal of photodiode D is connected to a bias voltage terminal VBIAS, and the other terminal of photodiode D is connected to a second electrode of the transistor T. The photodiode D is connected in parallel with the capacitor Cst. In one example, the signal output terminal Gate may be connected to one signal output terminal of the gate driving circuit by a gate signal line. The photodiode D may generate charges in response to X-ray irradiation, and the generated charges are stored at the capacitor Cst. When the transistor T is turned on by the gate driving signal provided to the gate of the transistor T from the gate driving circuit, the charges stored at the capacitor Cst are supplied to the charge collecting sub-circuit 4313.

The charge collecting sub-circuit 4313 includes an operational amplifier OP, a variable capacitor CF, and a switch INSRST. The charge collecting sub-circuit 4313 may collect the charges generated by the photodiode D and convert the collected charges into a voltage signal. The charge collecting sub-circuit 4313 may be connected to the first sampling sub-circuit 4311 and the second sampling sub-circuit 4312.

The filter sub-circuit 4314 may include a low pass filter LPF and a switch FA, the low pass filter LPF and the switch FA are connected in parallel between the charge collecting sub-circuit 4313 and 4312. An input terminal of the filter sub-circuit is connected to an output terminal Vout of the charge collecting sub-circuit 4313.

The first sampling sub-circuit 4311 may read a noise signal from K columns of pixels in the column of pixel units which are connected to the first sampling sub-circuit under control of the first readout control signal CDS1 between an $(i-1)^{th}$ detecting period and an $i^{th}$ detecting period. For example, the first sampling sub-circuit 4311 includes a switch Scds1 and a capacitor C1. One terminal of the switch Scds1 is connected to the filter sub-circuit 4314, and the other terminal of the switch Scds1 is connected to a first output terminal Vcds1. One terminal of the capacitor C1 is connected to the first output terminal Vcds1, and the other terminal of the capacitor C1 is grounded. Under control of the first readout control signal CSD1, the switch Scds1 is switched on. After passing through the switch Scds1, the charges are stored in the capacitor C1, so that the noise signal may be read from three columns of pixels P in the column of pixel units which are connected to the first sampling sub-circuit.

The second sampling sub-circuit 4312 includes a switch Scds2 and a capacitor C2. One terminal of the switch Scds2 is connected to the filter sub-circuit 4314, and the other terminal of the switch Scds2 is connected to a second output terminal Vcds2. One terminal of the capacitor C2 is connected to the second output terminal Vcds2, and the other terminal of the capacitor C2 is grounded. The second sampling sub-circuit 4312 may read the photoelectric signal from K columns of pixels in the column of pixel units which are connected to the second sampling sub-circuit under control of the second readout control signal CDS2 in the $i^{th}$ detecting period. For example, under control of the second readout control signal CDS2, the switch Scds2 is switched on. After passing through the switch Scds2, the charges are stored in the capacitor C2, so that the photoelectric signal containing a noise may be read from three columns of pixels in the column of pixel units which are connected to the second sampling sub-circuit.

The signal conversion circuit 432 is connected to the plurality of readout channels 431. The signal conversion circuit 432 may convert signals from the plurality of readout channels 431 into image data supported by the control circuit. For example, the signal conversion circuit 432 includes an analog to digital conversion sub-circuit ADC and a data processing sub-circuit DP. In some embodiments, the signal conversion circuit 432 may also include a multiplex sub-circuit MUX2. An input terminal of the multiplex sub-circuit MUX2 is connected to output terminals of the plurality of readout channels 431, and an output terminal of the multiplex sub-circuit MUX2 is connected to an input terminal of the analog to digital conversion sub-circuit ADC. An output terminal of the analog to digital conversion sub-circuit ADC is connected to the data processing sub-circuit DP. After passing through the multiplex sub-circuit MUX2, a signal from the readout channel 431 is converted into a digital signal Vadc by the analog to digital conversion sub-circuit ADC. Next, the data processing sub-circuit DP may convert the digital signal Vadc into image data supported by the control circuit, such as image data in a low-voltage differential signaling (LVDS) format. In one example, the signal from the readout channels 431 may be signals from the plurality of readout channels 431. Through the embodiment of the present disclosure, the noise signal in the photoelectric signal may be removed by computing based on the noise signal and the photoelectric signal, thereby effectively reducing the noise of the flat panel detector.

Although the embodiments of the present disclosure provide an example structure of a gate driving circuit and a reading circuit, the embodiments of the present disclosure are not limited thereto. The gate driving circuit and the reading circuit of any suitable structure may be selected as desired.

Figure 5:
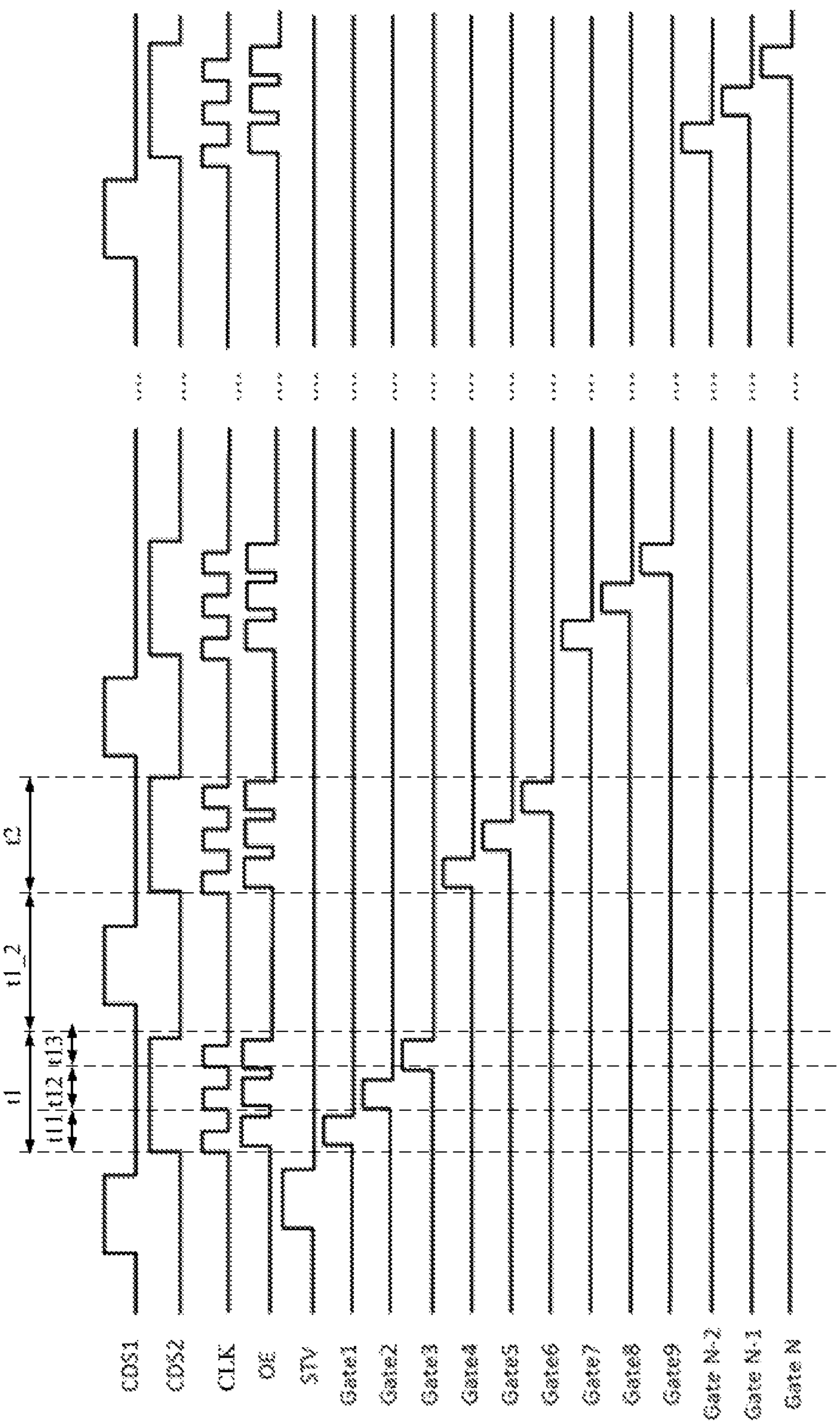
FIG. 5 is an operation timing diagram of a flat panel detector according to another embodiment of the present disclosure.

FIG. 5 is an operation sequence diagram of a flat panel detector according to another embodiment of the present disclosure. The operation sequence of FIG. 5 will be described below in combination with the flat panel detector of any of the above embodiments.

As described above, the control circuit may provide a gate control signal to the gate driving circuit and provide a readout control signal to the readout circuit. The gate control signal may include a clock signal CLK and an enable signal OE. The readout control signal may include a first sampling control signal CDS1 and a second sampling control signal CDS2.

Each detecting period may include a plurality of sub-periods. For example, a detecting period t1 includes a sub-period t11, a sub-period t12 and a sub-period t13. Similarly, a detecting period t2 also includes three corresponding sub-periods.

In the sub-period t11 of the detecting period t1, the gate driving circuit 120 generates a gate driving signal Gate1 based on the enable signal OE in response to a high level of the clock signal CLK. The gate driving signal Gate1 is supplied to a first row of pixels of a first row of pixel units to turn on the first row of pixels.

In the sub-period t12 of the detecting period t1, the gate driving circuit 120 generates a gate driving signal Gate2 based on the enable signal OE in response to a high level of the clock signal CLK. The gate driving signal Gate2 is supplied to a second row of pixels of the first row of pixel units. The second row of pixels of the first row of pixel units are turned on.

In the sub-period t13 of the detecting period t1, in a similar manner, the gate driving circuit 120 generates a gate driving signal Gate3 and provides the gate driving signal Gate3 to a third row of pixels of the first row of pixel units to turn on the third row of pixels.

In the period t1, the first row of pixels, the second row of pixels and the third row of pixels are turned on in turn, and the second sampling control signal CDS2 is a high level, so that the second sampling circuit reads the photoelectric signals from three columns of pixels in each column of pixel units under control of the second sampling control signal CDS2, so as to read the photoelectric signals generated from the first row of pixels to the third row of pixels in each pixel unit.

In a period t1_2 between the detecting period t1 and the detecting period t2, the first row of pixels, the second row of pixels and the third row of pixels are all in turned-off state. The first sampling control signal CDS1 is a high level. The first sampling circuit reads a noise signal from the read signal line(s) connected to three columns of pixels in each column of pixel unit under control of the first sampling control signal CDS1. The readout circuit 130 may remove the read noise signal from the read photoelectric signals, and generate image data based on the photoelectric signals after removing the noise to make the image data more accurate.

In the next detecting period t2, the operation similar to the above may be performed to turn on the third to sixth rows of pixels (i.e., the three rows of pixels belonging to the second row of pixel units) row by row and read the photoelectric signal from the third to sixth rows of pixels. And so on, the data reading of all pixels may be completed.

By setting the enable signal OE and the clock signal CLK, the embodiment of the present disclosure scans and reads data row by row by taking K rows of pixels as a group in a simple way, wherein K is an odd number. For example, the enable signal OE and the clock signal CLK are configured to include three independent pulses in one detecting period, with a pulse width being less than or equal to one third of the pulse width of the second sampling control signal CDS1, so that scanning and reading data row by row by taking three rows of pixels as a group is achieved.

Figure 6:
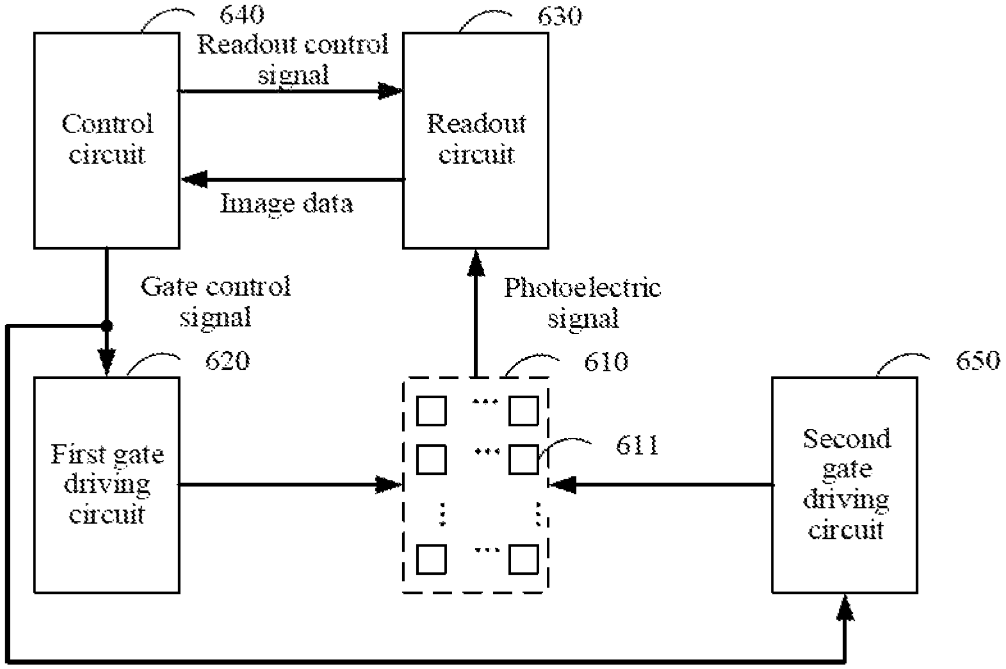
FIG. 6 is a schematic block diagram of a flat panel detector according to another embodiment of the present disclosure.
Figure 7:
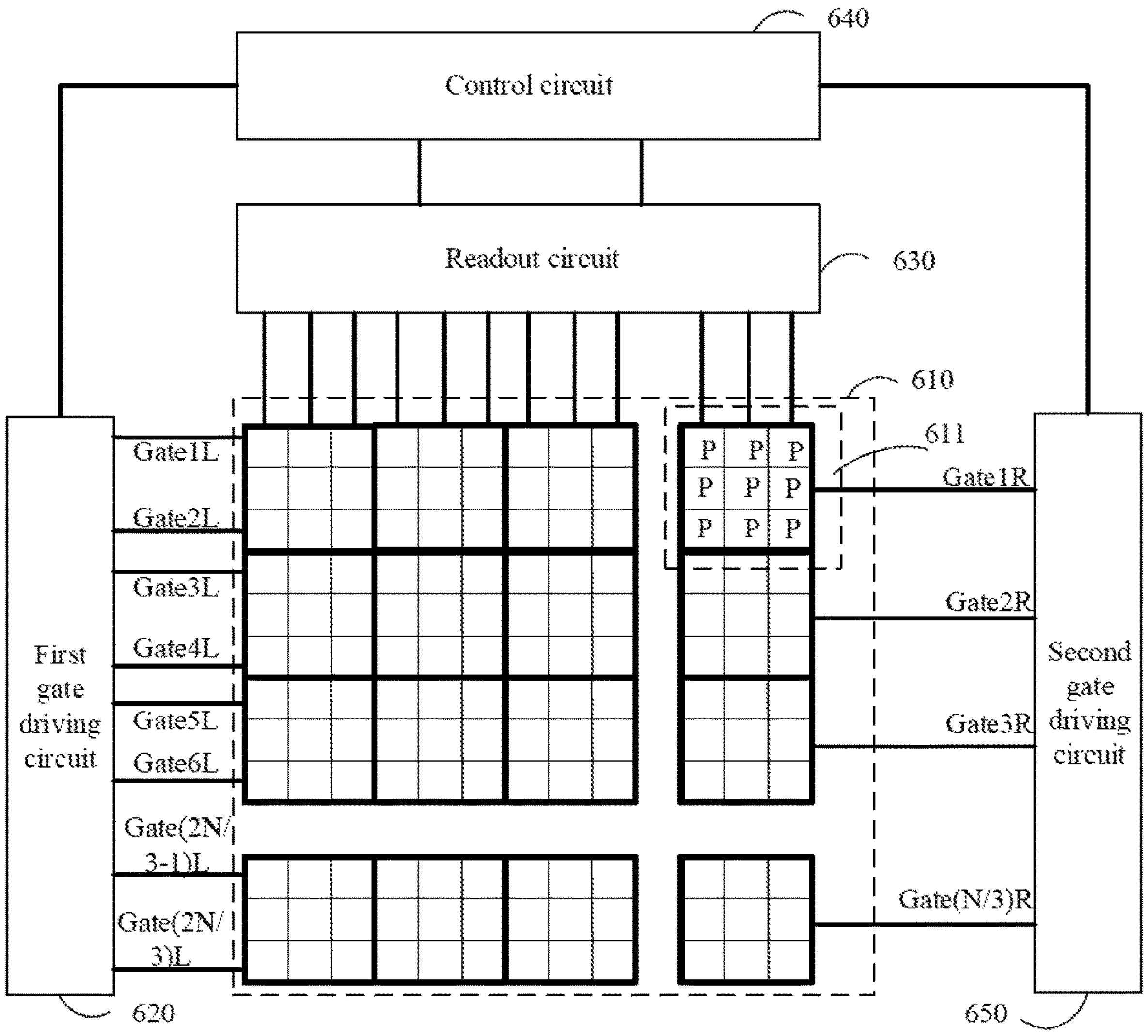
FIG. 7 is a schematic block diagram of a flat panel detector according to another embodiment of the present disclosure.

An example structure of a flat panel detector according to another embodiment of the present disclosure will be described below with reference to FIG. 6 and FIG. 7. FIG. 6 is a schematic block diagram of a flat panel detector according to another embodiment of the present disclosure. FIG. 7 is a schematic block diagram of a flat panel detector according to another embodiment of the present disclosure. As shown in FIG. 6 and FIG. 7, the flat panel detector 600 includes a plurality of pixel units 611 arranged in an array 610, a readout circuit 630, and a control circuit 640. The above description of the array 110, the readout circuit 130 and the control circuit 140 are also applicable to this embodiment.

Unlike the flat panel detector 100, the gate driving circuit of the flat panel detector 600 includes a first gate driving circuit 620 and a second gate driving circuit 650. The first gate driving circuit 620 may have an ability of double-rows scanning, that is simultaneously turning on two rows of pixels in each scanning. The second gate driving circuit 650 may have an ability of single-row scanning, that is turning on one row of pixels in each scanning.

The first gate driving circuit 620 is connected to (K−1) rows of pixels in each pixel unit 611 of each row of pixel units by (K−1) gate signal lines. For example, in FIG. 7, the first gate driving circuit 620 may be respectively connected to the first row of pixels and the third row of pixels in each pixel unit 611 by two gate signal lines. The first gate driving circuit 620 may, in the $i^{th}$ detecting period, simultaneously turn on (K−1) rows of pixels, which are connected to the first gate driving circuit, in an $i^{th}$ row of pixel units under control of the gate control signal, so as to cause the turned-on (K−1) rows of pixels to generate photoelectric signals, wherein i is an integer greater than or equal to 1. For example, in FIG. 7, the first gate driving circuit 620 may simultaneously turn on the first row of pixels and the third row of pixels in each pixel unit 611.

The second gate driving circuit 650 is connected to one row of pixels except the (K−1) rows of pixels in each pixel unit 611 of each row of pixel units by one gate signal line. For example, in FIG. 7, the second gate circuit 650 may be connected to a second row of pixels in each pixel unit by one gate signal line. The second gate driving circuit 650 may, in the $i^{th}$ detecting period, turn on one row of pixels connected to the second gate driving circuit in the $i^{th}$ row of pixel units under control of the gate control signal, so as to cause the turned-on one row of pixels to generate photoelectric signals. For example, in FIG. 7, the second gate circuit 650 may turn on the second row of pixels in each pixel unit.

A plurality of pixel units 611 arranged in the array 610 are disposed between the first gate driving circuit 620 and the second gate driving circuit 650 in a row direction of the array 610. In some embodiments, the first gate driving circuit 620 and the second gate driving circuit 650 may have the structure of the gate driving circuit of any of the above embodiments. Although the embodiments of the present disclosure provide an example structure of a gate driving circuit and a reading circuit, the embodiments of the present disclosure are not limited thereto. The gate driving circuit and the reading circuit of any suitable structure may be selected as desired.

Figure 8:
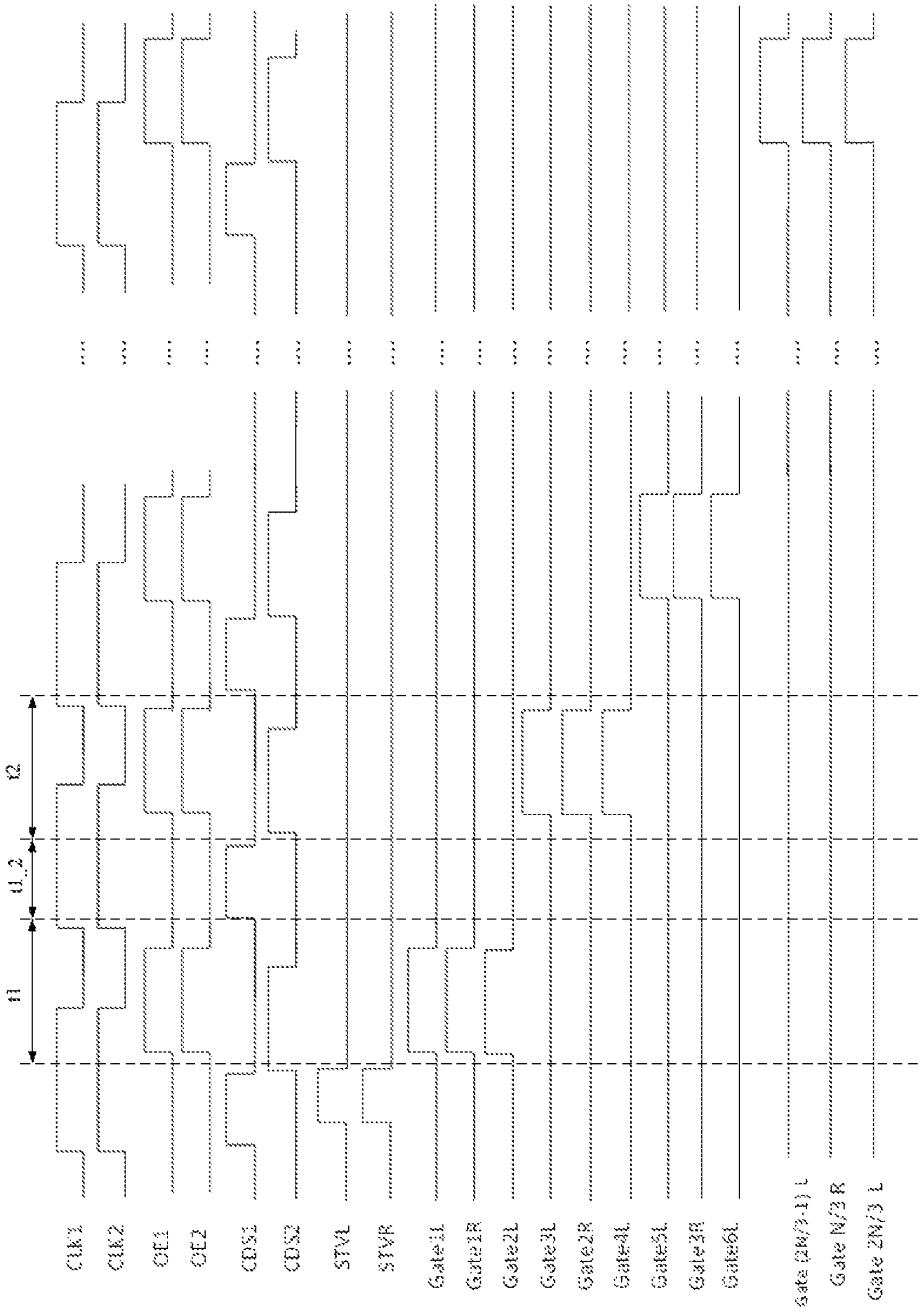
FIG. 8 is an operation timing diagram of a flat panel detector according to another embodiment of the present disclosure.

FIG. 8 is an operation sequence diagram of a flat panel detector according to another embodiment of the present disclosure. The operation sequence of FIG. 8 will be described below in combination with the above flat panel detector 700.

As described above, the control circuit 740 may provide gate control signal(s) to the first gate driving circuit 720 and the second gate driving circuit 750, and provide readout control signal(s) to the readout circuit 230. The clock signal may include a first clock signal CLK1 and a second clock signal CLK2, and the enable signal includes a first enable signal OE1 and a second enable signal OE2. In the embodiment of the present disclosure, the first clock signal CLK1 is synchronized with the second clock signal CLK2. Alternatively, the first clock signal CLK1 and the the second clock signal CLK2 may implemented as one and the same clock signal. The first enable signal OE1 is synchronized with the second enable signal OE2. Alternatively, the first enable signal OE1 and the second enable signal OE may be implemented as one and the same enable signal. The readout control signal includes a first sampling control signal CDS1 and a second sampling control signal CDS2.

In the detecting period t1, the first gate driving circuit 620 generates a gate driving signal Gate1L and a gate driving signal Gate2L which are both at high level, based on the first enable signal OE1 under control of the first clock signal CLK1. The second gate driving circuit 650 generates a gate driving signal Gate1R based on the second enable signal OE2 under control of the clock signal CLK2. The first gate driving circuit 620 provides the gate driving signal Gate1L to the first row of pixels in the first row of pixel units in the array 610, so that the first row of pixels are turned on. The gate driving signal Gate2L is supplied to the third row of pixels in the first row of pixel units in the array 610, so that the third row of pixels are turned on. The gate driving signal Gate1R is supplied to the second row of pixels in the first row of pixel units in the array 610, so that the second row of pixels are turned on. In this way, the second row of pixels in the first row of pixel units is turned on at the same time as the first row of pixels and the third row of pixels in the first row of pixel units, so that the three rows of pixels are simultaneously.

In the detecting period t1, since the second sampling control signal CDS2 is a high level, the second sampling sub-circuit reads the photoelectric signals from three columns of pixels in each column of pixel unit under control of the second sampling control signal CDS2, thereby reading the photoelectric signals generated from three rows of pixels in the first row of pixel units in response to the X-ray irradiation. Next, similar to the above embodiment, in the period t1_2 between the detecting period t1 and the detecting period t2, the first sampling sub-circuit reads the noise signal from three columns of pixels in each column pixel unit under control of the first sampling control signal CDS1. The readout circuit 730 may remove the read noise signal from the read photoelectric signals, thereby generating more accurate image data.

According to the embodiment of the present disclosure, by using the first gate driving circuit and the second gate driving circuit, with one performs double-rows scanning and the other performs single-row scanning, scanning and reading data by taking K rows of pixels as a group may be achieved in a simple way, wherein K is an odd number. Since the plurality of rows of pixels in one row of pixel units are simultaneously turned on at the same time and the turned-on time is long, the turned-on time of pixels may be fully guaranteed, thus the sampling time may be fully guaranteed, and the accuracy of image data may be improved.

Figure 9:
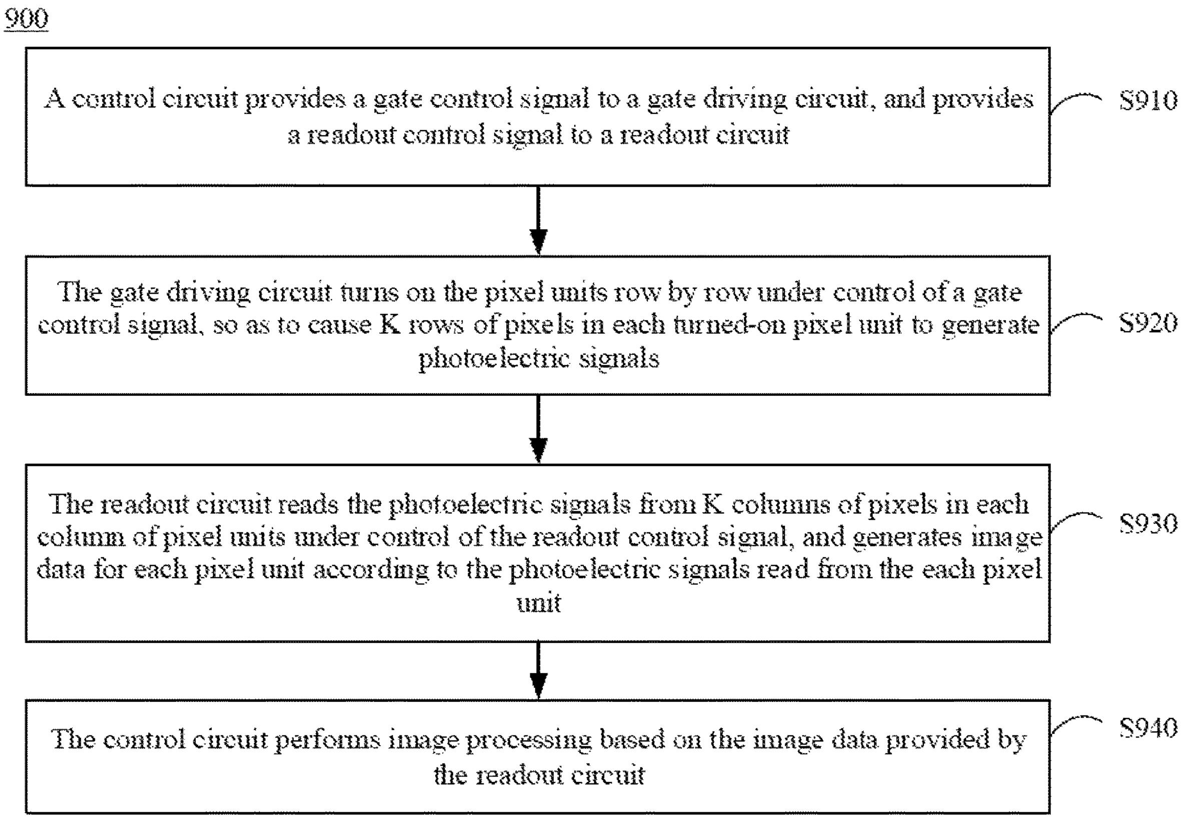
FIG. 9 is a flowchart of a method performed by a flat panel detector according to an embodiment of the present disclosure.

FIG. 9 is a flowchart of a control method performed by a flat panel detector according to an embodiment of the present disclosure.

As shown in FIG. 9, the method 900 includes operations S910 to S940.

In operation S910, a control circuit provides a gate control signal to a gate driving circuit and provides a readout control signal to a readout circuit.

In operation S920, the gate driving circuit turns on the pixel units row by row under control of a gate control signal, so as to cause K rows of pixels in each turned-on pixel unit to generate photoelectric signals.

In operation S930, the readout circuit reads the photoelectric signals from K columns of pixels in each column of pixel units under control of the readout control signal, and generates image data for each pixel unit according to the photoelectric signals read from the each pixel unit.

In operation S940, the control circuit performs image processing based on the image data provided by the readout circuit.

In some embodiments, turning on pixel units row by row, so as to cause K rows of pixels in each turned-on pixel unit to generate photoelectric signals, includes: in an $i^{th}$ detecting period, turning on K rows of pixels in each pixel unit of an $i^{th}$ row of pixel units row by row, so as to cause each turned-on row of pixels to generate photoelectric signals, wherein i is an integer greater than or equal to 1.

In some embodiments, the gate control signal includes a clock signal and an enable signal, the $i^{th}$ detecting period includes K sub-periods, and in the $i^{th}$ detecting period, turning on K rows of pixels in each pixel unit of the $i^{th}$ row of pixel units row by row, so that the turned-on each row of pixels generate the photoelectric signals, includes: in a $k^{th}$ sub-period of the $i^{th}$ period, generating a gate driving signal based on the enable signal under control of the clock signal and providing the gate driving signal to a $k^{th}$ row of pixels in each pixel unit of the $i^{th}$ row of pixel units, so that the $k^{th}$ row of pixels are turned on, wherein k is an integer and $1 \leq k \leq K$.

In some embodiments, the gate driving circuit includes a first gate driving circuit and a second gate driving circuit, and turning on pixel units row by row, so as to cause K rows of pixels in each turned-on pixel unit to generate photoelectric signals, includes: in the $i^{th}$ detecting period, simultaneously turning on, by the first gate driving circuit, (K−1) rows of pixels connected to the first gate driving circuit in an $i^{th}$ row of pixel units under control of the gate control signal, so as to cause the turned-on (K−1) rows of pixels to generate photoelectric signals, wherein i is an integer greater than or equal to 1; and in the $i^{th}$ detecting period, turning on, by the second gate driving circuit, one row of pixels connected to the second gate driving circuit in the $i^{th}$ row of pixel units under control of the gate control signal, so as to cause the turned-on one row of pixels to generate photoelectric signals.

In some embodiments, the gate control signal includes a first clock signal, a second clock signal, a first enable signal and a second enable signal, wherein the first clock signal is synchronized with the second clock signal, and the first enable signal is synchronized with the second enable signal. In the $i^{th}$ detecting period, the first gate driving circuit generates a gate driving signal based on the first enable signal under control of the first clock signal and provides the gate driving signal to (K−1) rows of pixels, which are connected to the first gate driving circuit, in the $i^{th}$ row of pixel units. In the $i^{th}$ detecting period, the first gate driving circuit generates a gate driving signal based on the second enable signal under control of the second clock signal and provides the gate driving signal to one row of pixels, which are connected to the second gate driving circuit, in the $i^{th}$ row of pixel units.

The embodiments of the present disclosure have been described above. However, these embodiments are only for the purpose of illustration, not to limit the scope of the present disclosure. Although the embodiments are described separately above, this does not mean that the measures in the embodiments may not be used together advantageously. The scope of the present disclosure is defined by the appended claims and their equivalents. Without departing from the scope of this disclosure, those skilled in the art may make a variety of substitutions and modifications, which should fall within the scope of this disclosure.

What is claimed is:

1. A flat panel detector, comprising:

a plurality of pixel units arranged in an array, wherein each of the plurality of pixel units comprises a plurality of pixels arranged in a K×K sub-array, each of the plurality of pixels is configured to provide a photoelectric signal, and K is an odd number greater than 1;

a gate driving circuit connected to a plurality of rows of pixel units in the array, wherein the gate driving circuit is configured to, in an $i^{th}$ detecting period, turn on an $i^{th}$ row of pixel units under control of a gate control signal, so as to cause K rows of pixels in each turned-on pixel unit to generate photoelectric signals, wherein i is an integer greater than or equal to 1;

a readout circuit connected to a plurality of columns of pixel units in the array, wherein the readout circuit is configured to, in the $i^{th}$ detecting period, read photoelectric signals from K columns of pixels in each column of pixel units under control of a readout control signal, and generate image data for each pixel unit according to the photoelectric signals read from the each pixel unit; and a control circuit connected to the gate driving circuit and the readout circuit, wherein the control circuit is configured to provide the gate control signal to the gate driving circuit, provide the readout control signal to the readout circuit, and perform data processing based on the image data provided by the readout circuit, wherein the gate control signal comprises a clock signal and an enable signal, wherein the gate driving circuit comprises a plurality of shift register units cascaded into stages, wherein a cascade output terminal of an $n^{th}$ stage of shift register unit is connected to an input terminal of a $(n+1)^{th}$ stage of shift register unit, a signal output terminal of each shift register unit is connected to one row of pixels, a clock terminal of each shift register unit is connected to receive a clock signal, an enable terminal of each shift register unit is connected to receive an enable signal, and each shift register unit is configured to provide a cascade output signal at the cascade output terminal and provide a gate driving signal at the signal output terminal, based on a signal at the input terminal and the enable signal at the enable terminal under control of the clock signal at the clock terminal, and wherein the shift register unit comprises a D flip-flop, an AND gate, a level shifter and an output buffer circuit, a first input terminal of the D flip-flop acts as the clock terminal of the shift register unit, a second input terminal of the D flip-flop acts as the input terminal of the shift register unit, an output terminal of the D flip-flop acts as the cascade output terminal of the shift register unit, a first input terminal of the AND gate acts as the enable terminal of the shift register unit, a second input terminal of the AND gate is connected to an output terminal of the D flip-flop, an output terminal of the AND gate is connected to an input terminal of the level shifter, an output terminal of the level shifter is connected to an input terminal of the output buffer circuit, and an output terminal of the output buffer circuit acts as the signal output terminal of the shift register unit.

2. The flat panel detector of claim 1, wherein the gate driving circuit is configured to, in the $i^{th}$ detecting period, turn on K rows of pixels in each pixel unit of the $i^{th}$ row of pixel units row by row under control of the gate control signal, so as to cause each turned-on row of pixels to generate photoelectric signals.

3. The flat panel detector of claim 2, wherein the $i^{th}$ detecting period comprises K sub-periods, the gate driving circuit is configured to, in a $k^{th}$ sub-period of the $i^{th}$ period, generate a gate driving signal based on the enable signal under control of the clock signal and provide the gate driving signal to a $k^{th}$ row of pixels in each pixel unit of the $i^{th}$ row of pixel units, so that the $k^{th}$ row of pixels are turned on, wherein k is an integer and $1 \leq k \leq K$.

4. The flat panel detector of claim 1, wherein the gate driving circuit comprises:

a first gate driving circuit connected to (K−1) rows of pixels in each pixel unit of each row of pixel units, wherein the first gate driving circuit is configured to, in the $i^{th}$ detecting period, simultaneously turn on (K−1) rows of pixels, which are connected to the first gate driving circuit, in an $i^{th}$ row of pixel units under control of the gate control signal, so as to cause the turned-on (K−1) rows of pixels to generate photoelectric signals, wherein i is an integer greater than or equal to 1; and a second gate driving circuit connected to one row of pixels except the (K−1) rows of pixels in each pixel unit of each row of pixel units, wherein the second gate driving circuit is configured to, in the $i^{th}$ detecting period, turn on one row of pixels, which are connected to the second gate driving circuit, in the $i^{th}$ row of pixel units under control of the gate control signal, so as to cause the turned-on one row of pixels to generate photoelectric signals.

5. The flat panel detector of claim 4, wherein the gate control signal comprises a first clock signal, a second clock signal, a first enable signal and a second enable signal, wherein the first clock signal is synchronized with the second clock signal, and the first enable signal is synchronized with the second enable signal, the first gate driving circuit is configured to, in the $i^{th}$ detecting period, generate a gate driving signal based on the first enable signal under control of the first clock signal and provide the gate driving signal to (K−1) rows of pixels, which are connected to the first gate driving circuit, in the $i^{th}$ row of pixel units; and the second gate driving circuit is configured to, in the $i^{th}$ detecting period, generate a gate driving signal based on the second enable signal under control of the second clock signal and provide the gate driving signal to one row of pixels, which are connected to the second gate driving circuit, in the $i^{th}$ row of pixel units.

6. The flat panel detector of claim 5, wherein the plurality of pixel units arranged in the array are disposed between the first gate driving circuit and the second gate driving circuit in a row direction of the array.

7. The flat panel detector of claim 1, wherein K=3 or 5.

8. The flat panel detector of claim 5, wherein K=3, the first gate driving circuit is connected to the first row of pixels and the third row of pixels in each pixel unit of each row of pixel units, and the second gate driving circuit is connected to the second row of pixels in each pixel unit of each row of pixel units.

9. The flat panel detector of claim 1, wherein the readout control signal comprises a first sampling control signal and a second sampling control signal, and the readout circuit comprises:

a plurality of readout channels connected to the plurality of columns of pixel units in the array in one-to-one correspondence, wherein each of the plurality of readout channels comprises a first sampling sub-circuit and a second sampling sub-circuit, the first sampling sub-circuit is configured to read a noise signal from K columns of pixels in the column of pixel units which are connected to the first sampling sub-circuit under control of a first readout control signal between an $(i-1)^{th}$ detecting period and an $i^{th}$ detecting period; and the second sampling sub-circuit is configured to read photoelectric signals from K columns of pixels in the column of pixel units which are connected to the second sampling sub-circuit under control of a second readout control signal in the $i^{th}$ detecting period; and a signal conversion circuit connected to the plurality of readout channels, wherein the signal conversion circuit is configured to convert a signal from the plurality of readout channels into image data supported by the control circuit.

10. The flat panel detector of claim 1, wherein the readout circuit is a readout integrated circuit (ROIC), and the control circuit is a field programmable gate array (FPGA).

11. A detecting method performed by a flat panel detector, the flat panel detector comprising:

a plurality of pixel units arranged in an array, wherein each of the plurality of pixel units comprises a plurality of pixels arranged in a K×K sub-array, each of the plurality of pixels is configured to provide a photoelectric signal, and K is an odd number greater than 1;

a gate driving circuit connected to a plurality of rows of pixel units in the array, wherein the gate driving circuit is configured to turn on the pixel units row by row under control of a gate control signal, so as to cause K rows of pixels in each turned-on pixel unit to generate photoelectric signals;

a readout circuit connected to a plurality of columns of pixel units in the array, wherein the readout circuit is configured to read photoelectric signals from K columns of pixels in each column of pixel units under control of a readout control signal, and generate image data for each pixel unit according to the photoelectric signals read from the each pixel unit; and a control circuit connected to the gate driving circuit and the readout circuit, wherein the control circuit is configured to provide the gate control signal to the gate driving circuit, provide the readout control signal to the readout circuit, and perform data processing based on the image data provided by the readout circuit, wherein the gate control signal comprises a clock signal and an enable signal, wherein the gate driving circuit comprises a plurality of shift register units cascaded into stages, wherein a cascade output terminal of an $n^{th}$ stage of shift register unit is connected to an input terminal of a $(n+1)^{th}$ stage of shift register unit, a signal output terminal of each shift register unit is connected to one row of pixels, a clock terminal of each shift register unit is connected to receive a clock signal, an enable terminal of each shift register unit is connected to receive an enable signal, and each shift register unit is configured to provide a cascade output signal at the cascade output terminal and provide a gate driving signal at the signal output terminal, based on a signal at the input terminal and the enable signal at the enable terminal under control of the clock signal at the clock terminal, and wherein the shift register unit comprises a D flip-flop, an AND gate, a level shifter and an output buffer circuit, a first input terminal of the D flip-flop acts as the clock terminal of the shift register unit, a second input terminal of the D flip-flop acts as the input terminal of the shift register unit, an output terminal of the D flip-flop acts as the cascade output terminal of the shift register unit, a first input terminal of the AND gate acts as the enable terminal of the shift register unit, a second input terminal of the AND gate is connected to an output terminal of the D flip-flop, an output terminal of the AND gate is connected to an input terminal of the level shifter, an output terminal of the level shifter is connected to an input terminal of the output buffer circuit, and an output terminal of the output buffer circuit acts as the signal output terminal of the shift register unit, the method comprising:

providing, by a control circuit, a gate control signal to a gate driving circuit and providing a readout control signal to a readout circuit;

in an $i^{th}$ detecting period, turning on, by the gate driving circuit, an $i^{th}$ row of pixel units under control of the gate control signal, so as to cause K rows of pixels in each turned-on pixel unit to generate photoelectric signals, wherein i is an integer greater than or equal to 1;

in the $i^{th}$ detecting period, reading, by the readout circuit, photoelectric signals from K columns of pixels in each columns of pixel units under control of the readout control signal, and generating image data for each pixel unit according to the photoelectric signals read from the each pixel unit; and performing, by the control circuit, image processing based on the image data provided by the readout circuit.

12. The method of claim 11, wherein turning on pixel units row by row, so as to cause K rows of pixels in each turned-on pixel unit to generate photoelectric signals, comprises:

in the $i^{th}$ detecting period, turning on K rows of pixels in each pixel unit of an $i^{th}$ row of pixel units row by row, so as to cause each turned-on row of pixels to generate photoelectric signals.

13. The method of claim 12, wherein the $i^{th}$ detecting period comprises K sub-periods, and in the $i^{th}$ detecting period, turning on K rows of pixels in each pixel unit of the $i^{th}$ row of pixel units row by row so that the turned-on each row of pixels generate the photoelectric signals, comprises:

in a $k^{th}$ sub-period of the $i^{th}$ period, generating a gate driving signal based on the enable signal under control of the clock signal and providing the gate driving signal to a $k^{th}$ row of pixels in each pixel unit of the $i^{th}$ row of pixel units, so that the $k^{th}$ row of pixels are turned on, wherein k is an integer and $1 \le k \le K$.

14. The method of claim 11, wherein the gate driving circuit comprises a first gate driving circuit and a second gate driving circuit, and turning on pixel units row by row, so as to cause K rows of pixels in each turned-on pixel unit to generate photoelectric signals, comprises:

in an $i^{th}$ detecting period, simultaneously turning on, by the first gate driving circuit, (K−1) rows of pixels connected to the first gate driving circuit in an $i^{th}$ row of pixel units under control of the gate control signal, so as to cause the turned-on (K−1) rows of pixels to generate photoelectric signals, wherein i is an integer greater than or equal to 1; and in the $i^{th}$ detecting period, turning on, by the second gate driving circuit, one row of pixels connected to the second gate driving circuit in the $i^{th}$ row of pixel units under control of the gate control signal, so as to cause the turned-on one row of pixels to generate photoelectric signals.

15. The method of claim 14, wherein the gate control signal comprises a first clock signal, a second clock signal, a first enable signal and a second enable signal, wherein the first clock signal is synchronized with the second clock signal, and the first enable signal is synchronized with the second enable signal, in the $i^{th}$ detecting period, the first gate driving circuit generates a gate driving signal based on the first enable signal under control of the first clock signal and provides the gate driving signal to (K−1) rows of pixels, which are connected to the first gate driving circuit, in the $i^{th}$ row of pixel units; and in the $i^{th}$ detecting period, the first gate driving circuit generates a gate driving signal based on the second enable signal under control of the second clock signal and provides the gate driving signal to one row of pixels, which are connected to the second gate driving circuit, in the $i^{th}$ row of pixel units.

* * * * *